United States Patent Office 3,554,861
Patented Jan. 12, 1971

3,554,861
HEAT-RESISTANT FIBROUS ASBESTOS BOARD WITH COMPOSITE BINDER
Eugene D. Ermenc and Marion F. Smith, Cincinnati, Ohio, assignors to Panacon Corporation, a corporation of Michigan
No Drawing. Filed July 6, 1967, Ser. No. 651,366
Int. Cl. D21h 5/18
U.S. Cl. 162—153                            3 Claims

ABSTRACT OF THE DISCLOSURE

An asbestos millboard particularly adapted for use under high temperature conditions composed of asbestos fibers of which at least 30 percent are crocidolite blue asbestos, the remainder being chrysotile asbestos, and wherein a composite binder is used, the binder being composed of starch and bentonite clay. The bentonite clay is a permanent binder and the starch a temporary binder, said starch decomposing when the millboard is used at high temperatures thereby leaving space for the expansion of the asbestos to eliminate cracking of said millboard.

CROSS REFERENCE TO RELATED APPLICATION

This application is related to a copending application in the name of William A. Moore, Ser. No. 395,816, filed Sept. 11, 1964, entitled "Heat-Resistant Fibrous Amphibole Asbestos Board Containing an Inorganic Binder," now U.S. Pat. No. 3,334,010, dated Aug. 1, 1967.

BACKGROUND OF THE INVENTION

The invention pertains to the filed of asbestos millboards which basically are composed of asbestos fiber with a minor proportion of a binder to bond the fibers together and to impart strength and other desirable properties to the board. Asbestos millboard is generally produced in thicknesses of 1/16 inch to about 1 inch and may be flexible or semi-rigid. The asbestos millboard to which the present invention pertains is to be distinguished from the so-called asbestos-cement boards in which the asbestos fiber is a minor component of the composition and the properties of the hardened portland cement predominate in the product.

Asbestos millboard has generally been made from chrysotile asbestos fibers or so-called white asbestos and various binders, both organic and inorganic, have been used. The most commonly used organic binder is starch in one form or another and the inorganic binder has commonly been portland cement. Starch, which is an effective binder for asbestos at ordinary temperatures is unfortunately subject to decomposition and carbonization at temperatures of about 300° F., so that its use is contraindicated where the millboard is to be used at elevated temperatures. Similarly, hydrated cured portland cement which is a good binder for asbestos fibers at low temperatures, begins to decompose and lose its water of dehydration at a temperature of about 700° F. The portland cement is, therefore, less heat resistant than the chrysotile asbestos from which such millboard is usually made.

In the related application hereinabove identified, an asbestos millboard was disclosed and claimed which was composed of a mixture of chrysotile and amphibole asbestos. The binder is disclosed as being a mixture of self-setting hydraulic cement and a montmorillonitic clay. The binder in this composition is wholly inorganic or mineral and the product was intended for use under high temperature conditions such as for the fabrication of conveyor rolls for use in the manufacture of sheet glass. It was observed that the product of said copending application served very well in small diameters when the rolls were mounted on small diameter shafts. However, in larger sizes of rolls, particularly where mounted on large diameter shafts, a tendency toward cracking of the asbestos millboard was observed.

SUMMARY

Basically the present invention is directed toward the solution of the problem of cracking where the asbestos millboard is used in the manufacture of large sized rolls and particularly where such rolls are to be mounted on large diameter shafts. The asbestos fiber composition may be the same as in said Moore application, that is, at least 30 percent by weight of the total fiber content should be of a tough resilient amphibole asbestos of paper-making grade selected from the class consisting of crocidolite and amosite. The remainder of the fiber is chrysotile asbestos of paper-making grade.

The binder may constitute from about 4 percent to about 15 percent by weight of the total furnish and the binder is composed of starch and a montmorillonitic clay such as bentonite. Generally speaking, the bentonite clay is the major constituent of the binder, and may be present in amounts between about 2 percent and 10 percent of the total furnish and the starch is the minor constituent, and may be between 0.5 percent and 10 percent of the total. Generally speaking also the quantity of clay and starch will vary more or less reciprocally. In other words, if the bentonite clay ingredient is increased, the starch content is usually decreased and vice versa. Ideally and for best results the bentonite clay will be about 5 percent of the total furnish and the starch about 2.5 percent. Preferably the crocidolite and chrysotile fibers will be present in substantially equal amounts.

DESCRIPTION OF THE PREFERRED EMBODIMENT

As described in said copending application, an important use of the improved asbestos millboard of the invention is in the manufacture of sheet glass some of which is processed into plate glass. Plate glass is manufactured by a number of different processes including the Fourcault process, described generally in said copending application, as well as several other processes. Most recently the industry has begun to adopt the so-called Pilkington process in the production of "float" glass. In the Pilkington process a bath of molten tin is provided. The molten tin has a very smooth liquid surface which is of course parallel to the earth's surface and has the curvature of the earth's surface. For practical purposes, however, as for example in the manufacture of a sheet of plate glass 12 feet by 12 feet, this may be considered perfectly flat. The molten glass floats on the flat molten tin surface and thus the face of the formed glass sheet takes the perfect smoothness of the molten tin surface. The upper surface of the liquid glass, affected by gravity, assumes the same form as the lower surface and since nothing is in contact with the upper surface of the molten glass it too has a perfectly smooth surface. Thus, there is formed a sheet of liquid glass with smooth liquid surfaces which are perfectly parallel to each other. The glass floats along the surface of the molten tin gradually entering into zones of lower temperature so that gradually the glass solidifies to a point where it can be pulled off the molten tin onto hot stainless steel rolls without distortion. The stainless steel rolls are disposed at the front end of an annealing furnace and by the time the glass sheet enters the annealing furnace it is down to about 1200° F. in temperature. In its passage through the annealing furnace it is supported on asbestos millboard rolls and the asbestos millboard rolls therefore operate in temperatures from about 1200° F. at the entrance to the annealing furnace down to about 500° F. at which point the glass plate is cool enough so that conventional asbestos millboard (made of white chrysotile asbestos) will serve satisfactorily. It is economically desirable at this point to use the white asbestos discs since they give satisfactory service at temperatures not in excess of about 500° F. and they are considerably less expensive than discs composed of substantial quantities of crocidolite blue asbestos.

Regardless of the particular glass making process employed, there are places where asbestos millboard rolls must be capable of withstanding temperatures in the vicinity of 1200° F. The millboard of the said copending application has served this purpose very satisfactorily until an attempt was made to use larger diameter rolls and to mount such rolls on larger diameter shafts. At this point, cracking of the millboard was found to develop.

Reference may be had to the said copending application for detailed descriptions of chrysotile asbestos and amphibole asbestos and particularly the crocidolite blue and the amosite asbestos. This detailed description will not be incorporated herein except by reference to the said copending application.

Basically, the problem above outlined has been solved herein by eliminating from the binder the portland cement component and substituting for it a starch component. This runs entirely contrary to the trend of development in the art because of the aforementioned property of starch insofar as its decomposition and carbonization at temperatures above about 300° F. is concerned. The rationale of this development is that the starch is not necessary in the final product in that the bentonite clay adequately performs the binding function. The starch binder in effect serves as an adhesive to adhere the fibers to each other in the millboard as produced and at the same time when the roll is heated and the starch burns out, a slippage between the fibers is made possible so that the composition can adjust itself to the expansion of the shaft due to heat and to the contraction of the fibers due to the loss of water of crystallization of the fibers. Thus the starch binder is a temporary binder, the bentonite clay being the primary and permanent binder. Furthermore, the elimination of the portland cement component further reduces the shrinkage problem because where portland cement is present the water of hydration thereof is also driven off thus compounding the shrinkage problem. Thus, by the elimination of portland cement the shrinkage problem is substantially reduced and by the introduction of the starch component a mutual slippage between the fibers is made possible so that the bonded fibrous mass can adjust itself when the product is heated.

So far as the asbestos component is concerned at least 30 percent by weight of the total fiber content should be a tough resilient amphibole asbestos of paper-making grade selected from the class consisting of crocidolite and amosite. The remainder of the fiber is chrysotile asbestos of paper-making grade. It has been found preferable that there be equal parts of amphibole asbestos and chrysotile asbestos and the asbestos content should be from 85 percent to about 96 percent of the total furnish.

The bentonite clay should be present in an amount between 2 percent and 10 percent by weight of the furnish, preferably between about 4 percent and about 8 percent. A figure that has served excellently in practice is about 5 percent.

The starch content will depend to some extent upon the type of starch used. For the present purposes, the most efficient starch has been found to be oxidized corn starch (such as the commercial product designated Staley CTM Starch) and the starch should be present in an amount between about 0.5 percent and about 10 percent and preferably between about 1.5 percent and about 5 percent. Thus the bentonite clay constitutes the major proportion of the binder, and the starch the minor proportion.

It will be understood that other starches may be desirable under some circumstances because of price or local availability. Thus raw potato starch, pearl (corn) starch, tapioca and rice starch may also be used. With such starches, the amount of starch may have to be increased by some 10 to 100 percent to get the same adhesive strengths.

It is of course entirely feasible to use chemically modified starches such as acetylated and esterified starches but the cost of these is almost double that of oxidized corn starch and their effectiveness as binders is not appreciably greater than that of oxidized starch; thus the extra cost is usually not warranted.

Generally speaking, if the starch quantity is increased the clay quantity is decreased and vice versa.

As an example of a preferred furnish, the table below gives the composition.

|  | Lb. |
|---|---|
| African crocidolite fiber, Grade H, 46.5% | 200 |
| Canadian chrysotile fiber, 4K or 4T 46.5% | 200 |
| Starch (oxidized corn starch), 2.3% | 10 |
| Bentonite clay 4.7% | 20 |

The table below gives properties of a product having the above preferred composition. In this table the figures given in the first column are at room temperature in the "as manufactured" condition before the millboard is made into discs. The abbreviation "MOR" means "modulus of rupture (flexural strength)" and "GLD" means "grain long direction" and "GSD" means "grain short direction."

|  | 77° F. | 1,200°, 22 hrs. |
|---|---|---|
| Weight, lb. per cu. ft. | 68.4 |  |
| Specification, lb. per cu. ft. | 60-70 |  |
| MOR, GLD | 1,427 | 837 |
| MOR, GSD | 747 | 480 |
| Compression at 1,000 p.s.i., percent | 9.1 | 11.8 |
| Recovery, percent | 54.9 | 47.5 |
| Weight loss, percent |  | 13.3 |
| Shrinkage, thickness percent |  | 1.8 |

The presence of bentonite is necessary in order to make the asbestos millboard form properly in laminating the plies on the wet machine. The problem of forming of the millboard is raised by the presence of the crocidolite blue fiber in the furnish. This fiber introduces special problems in forming because of the fact that crocidolite asbestos carries a weak negative electrical charge while chrysotile asbestos carries a strong positive charge. Without bentonite the furnish does not laminate well. Furthermore, it does not tool out well. Bentonite is necessary among other reasons because of the fact that without the bentonite this furnish would not form properly on a wet machine. The rolls, as a final step in their manufacture, are turned down to a particular diameter to produce a smooth finished roll. Starch imparts the the 77° F. strength necessary in order to make the product machine well. As can be seen from the second table above, the product of the present invention gives improved heat stability performance at high temperatures for large diameter rolls. The substantial recovery in thickness (47.5%) after heating to 1200° F. for 22 hours and compressing at 1000 p.s.i. and the very low shrinkage (1.8%) in thickness under the same high temperature exposure are physical property measurements which show directly the great heat stability of the millboard of this invention. The bentonite clay imparts substantial heat bonding strength besides permitting formation of the millboard on the wet machine. The starch serves as an initial adhesive and in burning out at high temperatures, it permits the adjustment of the fibers and thus eliminates the cracking problem.

Numerous variations within the boundary set forth herein may be made without departing from the spirit of the invention and therefore no limitation not specifically set forth is intended or should be implied.

The embodiments of the invention in which an exclusive property or privilege is claimed are defined as follows:

1. An asbestos millboard composed of from about 85% to about 96% of asbestos fibers of paper-making grade, said fibers including at least 30% by weight of the total fiber content of crocidolite blue asbestos, bonded with about 1.5% to about 5.0% by weight of starch as a heat-decomposible organic, temporary binder and with about 4% to about 8% by weight of plastic bentonite clay as a heat-resistant inorganic, permanent binder for said asbestos fibers, said starch and bentonite constituting the sole binding components in the product, said asbestos millboard being of adequate strength for fabrication of die-cut discs therefrom and characterized by very low heat shrinkage, substantial resilience after being heated and compressed, and being highly resistant to cracking at high temperatures, whereby an asbestos-covered roll fabricated from said asbestos millboard discs is enabled to endure continuous or intermittent contact with sheet material having a surface temperature up to 1200° F. for long periods of time without substantial structural deterioration of said millboard.

2. An asbestos millboard product according to claim 1, in which said crocidolite blue asbestos is about 50% of the total asbestos fiber content, said starch temporary binder is about 2.3% by weight and said bentonite clay permanent binder is about 4.7% by weight of said asbestos billboard composition.

3. An asbestos millboard product according to claim 1 in which said starch temporary binder is an oxidized corn starch.

References Cited
UNITED STATES PATENTS

| | | | |
|---|---|---|---|
| 2,407,581 | 9/1946 | Smith | 162—155 |
| 2,567,558 | 9/1951 | Greider | 162—155 |
| 3,281,411 | 10/1966 | Lemmerling | 260—233.5 |
| 3,334,011 | 8/1967 | Moore | 162—154 |

S. LEON BASHORE, Primary Examiner

R. H. ANDERSON, Assistant Examiner

U.S. Cl. X.R.

65—99; 161—205; 162—155, 175, 181